E. S. FIELD.

Assignor, by mesne assignments, to THE NATIONAL WIRE MATTRESS COMPANY.

SPRING BED BOTTOM.

No. 9,919. Reissued Nov. 1, 1881.

Witnesses.
John Edwards Jr.
Charles B. Otterson

Inventor.
Edwin S. Field.
By James Shepard
Atty.

UNITED STATES PATENT OFFICE.

EDWIN S. FIELD, OF SPRINGFIELD, MASSACHUSETTS, ASSIGNOR, BY MESNE ASSIGNMENTS, TO THE NATIONAL WIRE MATTRESS COMPANY, OF NEW BRITAIN, CONNECTICUT.

SPRING BED-BOTTOM.

SPECIFICATION forming part of Reissued Letters Patent No. 9,919, dated November 1, 1881.

Original No. 138,490, dated May 6, 1873. Application for reissue filed August 29, 1881.

DIVISION A.

*To all whom it may concern:*

Be it known that I, EDWIN S. FIELD, of Springfield, in the county of Hampden and State of Massachusetts, have invented certain new and useful Improvements in Spring-Beds, of which the following is a specification, reference being had to the accompanying drawings.

I have for convenience' sake divided the invention into two divisions, A and B, that part thereof described and claimed in this specification being included in Division A.

This invention relates to the production of a wire mattress; and the parts in which the invention consists will be particularly specified in the claims at the end of this specification.

Figure 1:
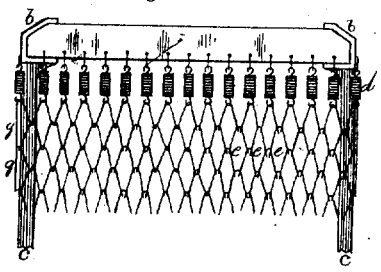
Figure 2:
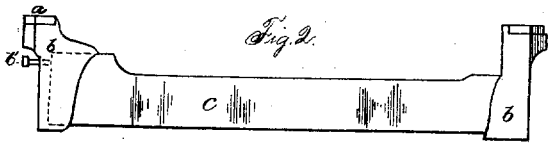
Figure 3:
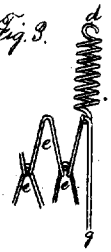
Figure 4:
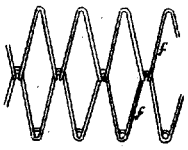

In the drawings, Figure 1 is a top or plan view of part of the frame or bed having one form or construction of my improved wire mattress attached thereto. Fig. 2 is a side view of such frame, consisting of two side rails united together by two end rails, which end rails are mounted above the side rails, as shown. Fig. 3 is a detached and enlarged view of the wire links composing the mattress shown in Fig. 1, showing, also, one of the spiral springs by which the netting is suspended to the end rails of the frame. Fig. 4 is a view of another method of forming the figures of wire shown in Fig. 1.

The letter *a* indicates one end piece of the bed-frame, its ends resting in corner-sockets, *b b*, which are set upon the side rails, *c c*, thereby elevating the end pieces above the side rails, as shown. These sockets are provided with adjusting-screws *b'*, whereby the tension of the fabric may be regulated. The other end piece is similar in construction, and rests in similar sockets attached to the ends of the side rails. To the end pieces are attached a series of spiral springs, *d d*. The opposite ends of these springs are attached to the wire-netting, each spring connecting with the apex of the V or half-diamond which is nearest to it in the wire-netting. The springs have hooked ends for that purpose. By this means the peculiar netting is elastically suspended from end to end of the frame.

The netting may be composed of V-shaped links having hooked ends, which take into the apex of the succeeding link; or, instead of single links, continuous wires *f* may be used, as seen in Fig. 4. The netting, whether of single links or continuous wires, is composed of connected and continuous diamond-shaped figures or meshes, and is very simple, strong, and efficient.

It will be observed that when these diamond-shaped figures or meshes are employed in connection with a series of longitudinally-acting spiral springs attached to the ends of the fabric and the elevated end pieces, as shown, if downward pressure is applied to any part of the netting, the strain will be felt by the springs not only lengthwise of the bed, but will be propagated diagonally in all directions, thus drawing more or less upon all the spiral springs, both at the head and foot of the bed.

Fig. 3 shows a peculiar-shaped link, *g*, for use at the side of the netting, the side row of figures being half-diamonds, as shown.

I do not claim, broadly, suspending a netting of wire to end rails only by tension-springs, as that is the subject of a prior patent, as I understand; but

What I claim is—

1. In a bed-bottom having elevated end pieces, the combination of side rails, elevated end pieces, longitudinally-acting spiral springs, and a wire-netting composed of connected and continuous diamond-shaped figures, said netting and spiral springs being suspended from the end pieces only, substantially as described, and for the purpose specified.

2. In a wire-netting for bed-bottoms having diamond-shaped meshes, V-shaped links, substantially as described.

3. Side links, *g*, substantially as described.

EDWIN S. FIELD.

Witnesses:
C. E. MITCHELL,
F. L. HUNGERFORD.